Dec. 28, 1965   R. J. KROOSS ETAL   3,225,716
GRIDDLE CAKE COOKING APPARATUS
Filed Aug. 9, 1963   3 Sheets-Sheet 1
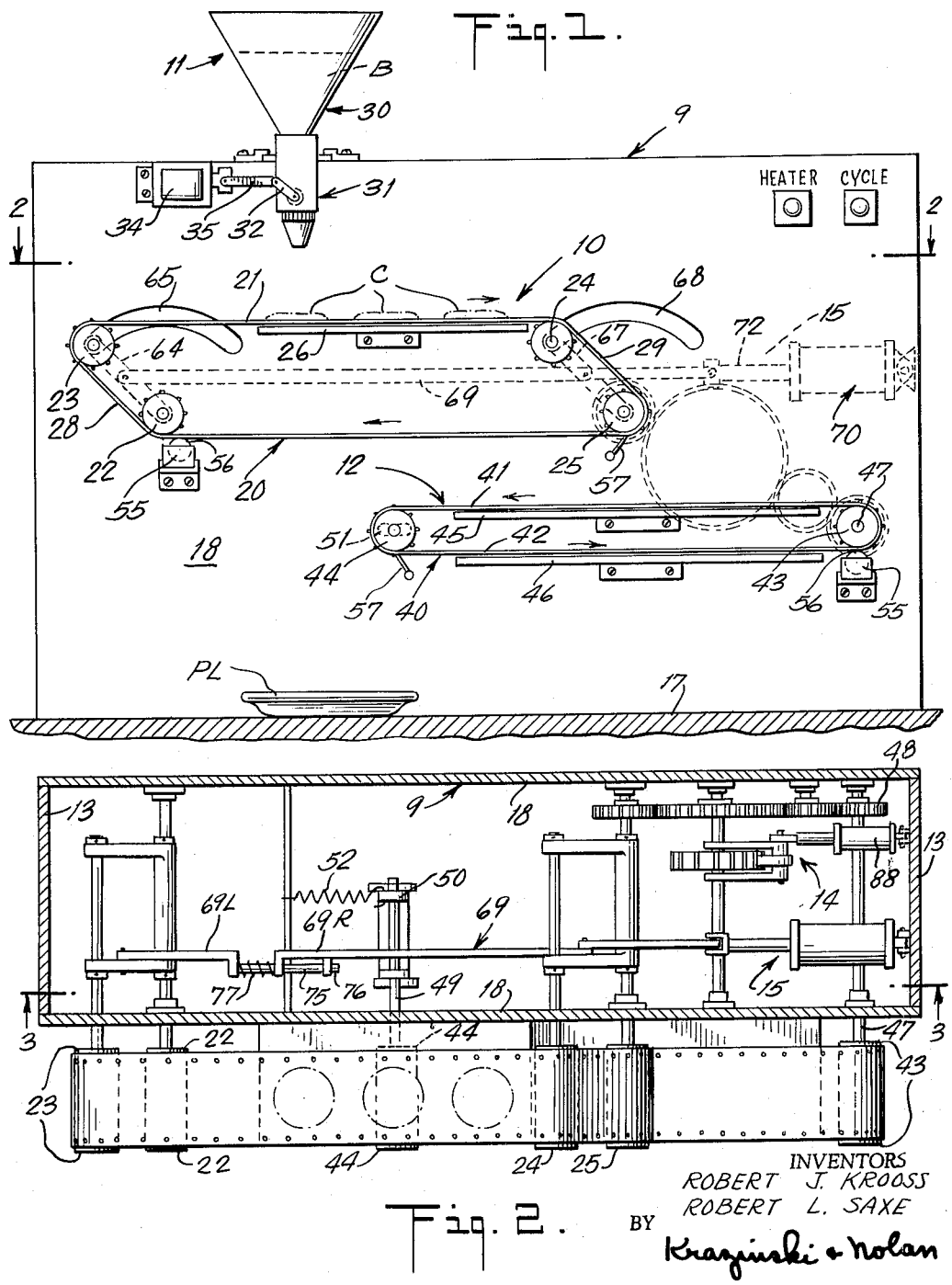
INVENTORS
ROBERT J. KROOSS
ROBERT L. SAXE
BY Krazinski + Nolan
ATTORNEYS Dec. 28, 1965   R. J. KROOSS ETAL   3,225,716
GRIDDLE CAKE COOKING APPARATUS
Filed Aug. 9, 1963   3 Sheets-Sheet 2
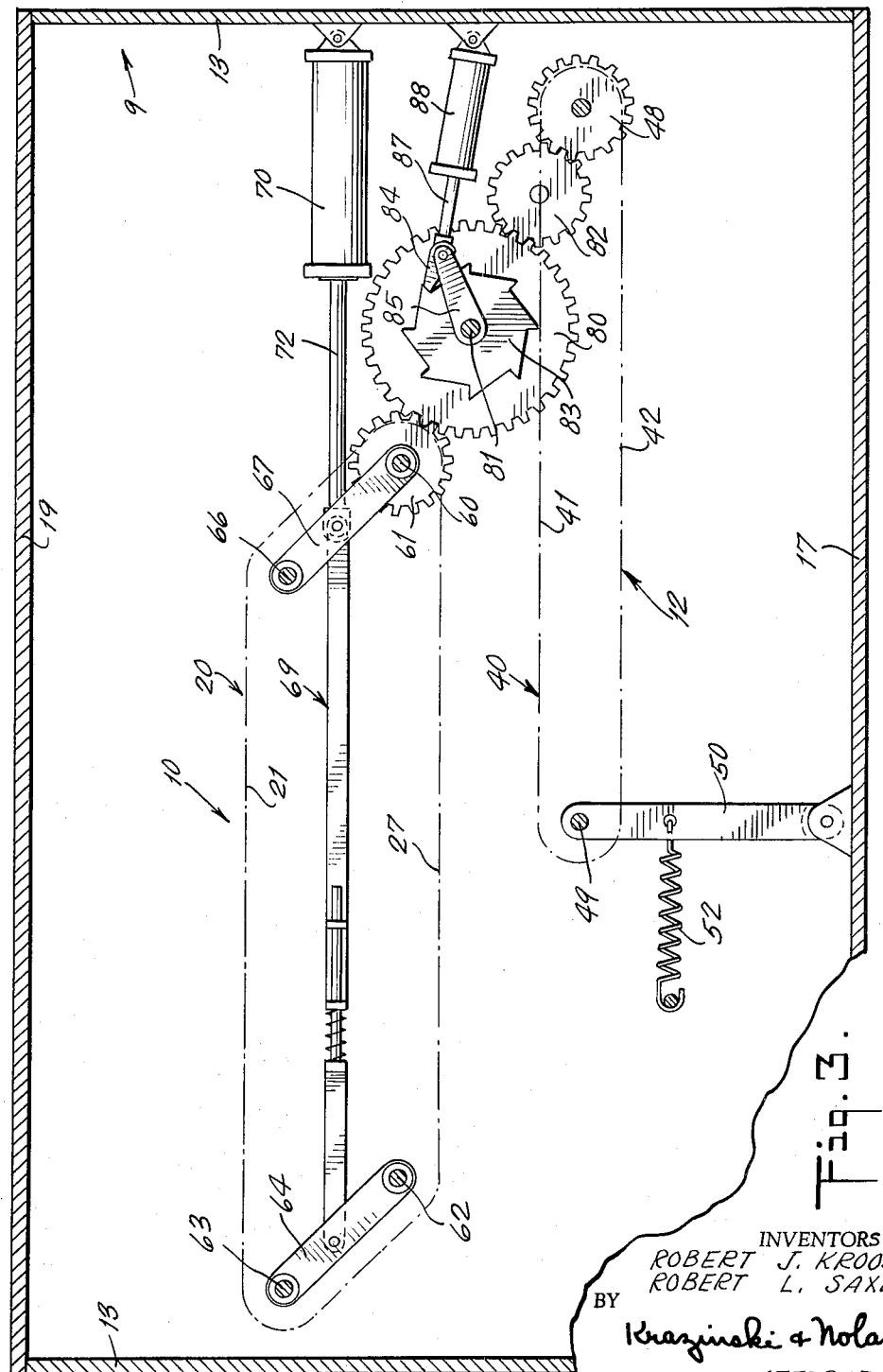
INVENTORS
ROBERT J. KROOSS
ROBERT L. SAXE
BY
Krazinski & Nolan
ATTORNEYS Dec. 28, 1965 R. J. KROOSS ETAL 3,225,716
GRIDDLE CAKE COOKING APPARATUS
Filed Aug. 9, 1963 3 Sheets-Sheet 3

INVENTORS
ROBERT J. KROOSS
ROBERT L. SAXE
BY
Krazinski & Nolan
ATTORNEYS

United States Patent Office 3,225,716
Patented Dec. 28, 1965

3,225,716
GRIDDLE CAKE COOKING APPARATUS
Robert J. Kroos, Mountain Lakes, N.J., and Robert L. Saxe, New York, N.Y., assignors of fifteen percent to Leo C. Krazinski, New York, N.Y., and twenty-five percent to Robert J. Kroos
Filed Aug. 9, 1963, Ser. No. 300,969
13 Claims. (Cl. 107—57)

The present invention relates to food processing machinery and, more particularly, to apparatus for cooking or baking griddle cakes, pancakes, flapjacks and the like, which apparatus includes an arrangement for automatically turning over the griddle cakes to cook both sides thereof.

In recent years griddle cakes and the like have become increasingly popular with the eating public. Normally, when cooking griddle cakes, close personal attention and manual action is required both to flip the griddle cakes and to do so in time to avoid overcooking or undercooking. Because of the cost and time required to provide such close cooking supervision, however, many eating places do not serve griddle cakes despite their popularity. A need has therefore arisen for an inexpensive and automatic method of cooking this type of food.

Numerous attempts have been made to devise machinery for automatically cooking griddle cakes in restaurants. Such machinery, however, has important drawbacks. The number of cakes which could be cooked in a given period of time is limited; a simple and reliable means is lacking for turning over the cakes; and the machinery has no interest-arousing appeal, if placed in a restaurant window, because the turnover action is not dramatically displayed.

Accordingly, an object of the present invention is to provide automatic griddle cake cooking apparatus which is not subject to the disadvantages and objections of such prior apparatus.

Another object is to provide such apparatus which first cooks the griddle cakes on one side thereof, turns the cakes over in an interesting, dramatic and reliable manner, cooks the other side of the cakes, and deposits the cooked cakes on a platter.

Another object is to provide such apparatus which is synchronized for feeding batter and for properly cooking both sides of the griddle cakes.

Another object is to provide such apparatus having griddles which are greased automatically and are readily cleaned or replaced.

A further object is to provide such apparatus which is compact and economical in construction and lends itself for display in restaurant windows to attract customers.

Other and further objects will be obvious upon an understanding of the illustrative embodimnet about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a front elevational view of apparatus in accordance with the present invention.

FIG. 2 is a sectional view taken along the line 2—2 on FIG. 1.

FIG. 3 is an enlarged fragmentary front elevational view illustrating an intermittently operated drive mechanism of the apparatus in detail.

GENERAL DESCRIPTION

Figures 4, 5:
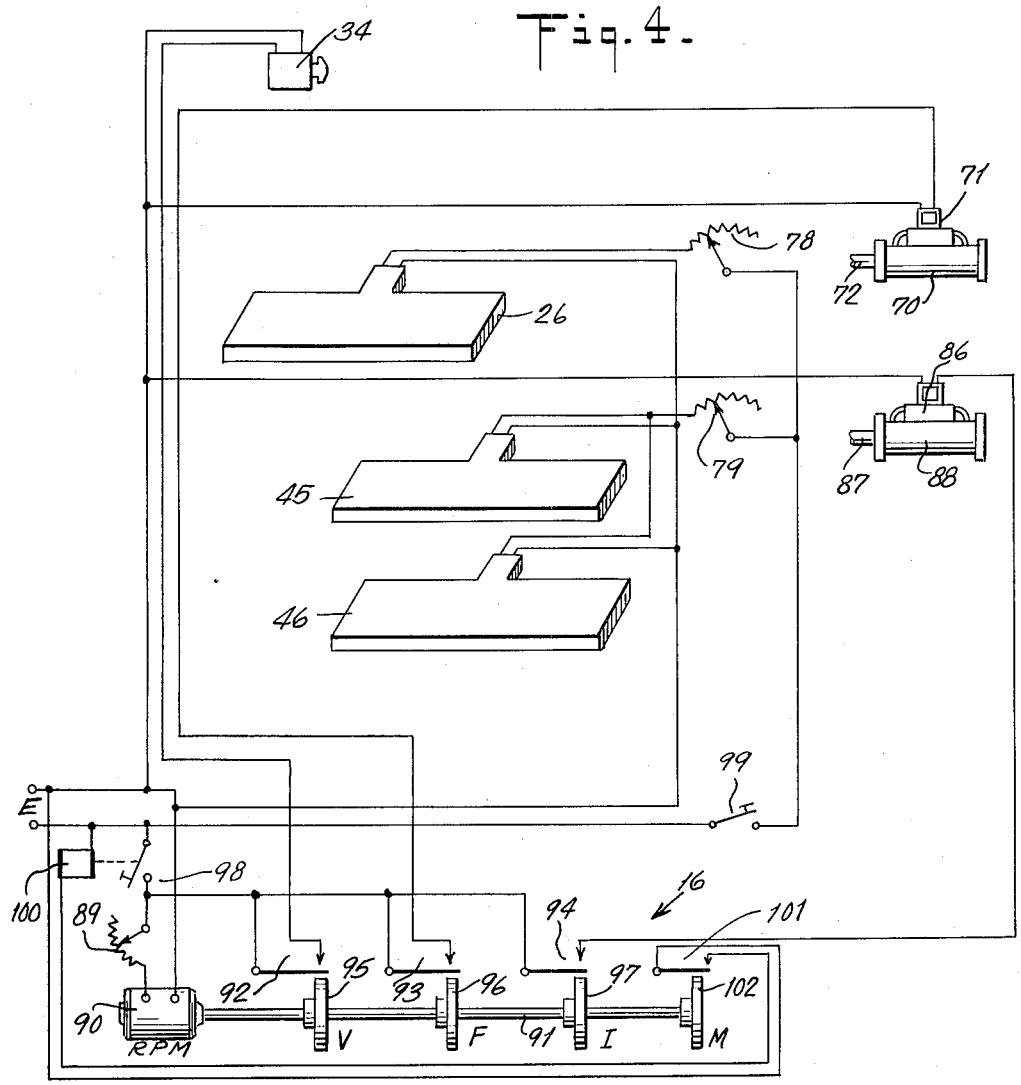
FIG. 4 is a schematic view of tiimng and synchronizing mechanism for the apparatus including a simplified electrical wiring diagram.
FIG. 5 is a chart illustrating the timing cycle of the mechanism shown in FIG. 4.

Referring now to FIGS. 1 to 3 of the drawings in detail, there is shown apparatus for cooking griddle cakes C and the like which apparatus generally comprises a frame 9, an upper endless conveyor 10 for cooking one side of the cakes, a hopper 11 above the conveyor 10 for depositing batter B on the upper conveyor, a lower conveyor 12 beneath the upper conveyor for cooking the other side of the cakes, mechanism 14 for moving the conveyors 10 and 12 stepwise, a turn-over arrangement 15 for the upper conveyor to position and shift the same in a manner to flip or turn over the cakes and transfer the same from the upper conveyor to the lower conveyor, and a timer 16 (FIG. 4) for controlling the operation of the conveyors, the depositing of batter and the turn-over arrangement.

THE FRAME

The frame 9 is generally rectangular and comprises a base 17, spaced apart front and back upright plates 18 on the base for supporting the conveyors and other mechanisms with the conveyors positioned above the front portion of the base, and a top 19 mounted on the plates 18 for supporting the hopper 11 and serving as a cover. Side plates 13 are connected to the plates 18 at their ends to completely enclose the mechanisms between the plates 18.

THE UPPER CONVEYOR

The upper conveyor 10 comprises an endless web 20 of soft, readily bendable heat conducting metal having a horizontal upper strand 21 serving as a griddle for cooking one side of the cakes thereon, pairs of sprockets 22, 23, 24 and 25 for driving the upper conveyor, and an electric heating plate 26 beneath and preferably in contact with the upper strand 21 for supplying heat thereto for cooking the cakes.

The sprockets 22 to 25 are driven to move the upper strand 21 from left to right as viewed and are arranged in a particular manner, as will be described in connection with the cake turnover means, to provide a horizontal lower strand 27 and slanted left and right side strands 28 and 29.

THE BATTER HOPPER

The hopper 11 comprises an upper funnel section 30 for storing batter B therein; a lower discharge section 31 having an inlet in communication with the lower end of the funnel section and having an outlet directly above the upper strand of the upper conveyor; a valve 32 of conventional construction in the discharge section between its inlet and outlet for controlling the flow of batter; and a solenoid 34 for operating the valve through linkage 35.

The valve 32 and solenoid 34 are constructed and arranged to discharge gobs of batter which are of a uniform predetermined size and which are deposited on the upper conveyor strand 21 to spread thereon into the circular or arcuate shape of the cakes to be cooked.

The batter discharge section 31 preferably is mounted on the top 19 of the frame in a manner to facilitate removal and replacement thereof, so that the same can be washed thoroughly at the end of each work period or even more frequently, if desired, together with the funnel section 30.

THE LOWER CONVEYOR

The lower conveyor 12 comprises an endless web 40 of soft, readily bendable heat conducting metal having a horizontal upper strand 41 and a horizontal lower strand 42, pairs of sprockets 43 and 44 for driving the lower conveyor, an electric heating plate 45 beneath and in contact with the upper strand 41 for supplying heat thereto for cooking the cakes on the upper strand, and an electric heating plate 46 beneath and in contact with the lower strand 42 for preheating the web 40 as it moves from a lower strand position to an upper strand position.

The sprockets 43 and 44 are driven to move the upper strand 41 from right to left as viewed, and are arranged to position the upper strand 41 beneath the upper conveyor 10 and partly to the right thereof to enable the cakes on the upper conveyor 10 to be dropped on the right side end of the upper strand 41 in turned-over position, whereby the strand 41 serves as a griddle for cooking the other side of the cakes. The lower conveyor 12 drops the cooked cakes on a plate PL supported on the base 17 beneath the left side or delivery end of the upper strand 41.

The sprockets 43 are secured on the front end of a shaft 47 journalled for rotation in the plates 18 and having a gear 48 thereon which is driven by the drive mechanism 14. The sprockets 44 may be similarly mounted, but for the purpose about to be explained are secured on the front end of a shaft 49 journalled for rotation in a bracket 50 between the plates 18. The lower end of the bracket 50 is pivotally mounted on the base 17, the front end of the shaft 49 extends through a guide slot 51 in the front plate 18, and a spring 52 urges the bracket in a direction to tension the web 40 between the sprockets 43 and 44.

This arrangement enables the bracket 50 and the sprockets 44 thereon to be moved towards the sprockets 43 and thereby relax the web 40 so that it can be removed from the sprockets for thorough cleaning and can be replaced thereafter in a convenient manner.

AUTOMATIC GREASING AND SCRAPING

If desired, the webs 20 and 40 may be greased automatically in advance of their heating plates by an arrangement (FIG. 1) comprising a box 55 for containing grease, and a pad 56 of grease absorbent material in the box and in sliding engagement with the lower strands of the upper and lower conveyors. Preferably, the transverse length of the pad 56 is such that it extends from practically one side edge to the other side edge of the webs.

Scrapers 57 for cleaning off crumbs on the webs 20 and 40 are positioned downstream of the webs just beyond the point where the cakes are discharged.

THE TURN-OVER ARRANGEMENT

The turn-over arrangement 15 involves the concept of normally slanting the delivery end side strand 29 of the upper conveyor 10 downhill from left to right and moving the strand 29 when a cake is thereon to slant downhill from right to left, so that the uncooked side of the cake faces downwardly and lands on the upper strand 41 of the lower conveyor 10 when it drops.

The arrangement for carrying out this concept illustrated herein comprises a shaft 60 (FIG. 3) journalled for rotation between the plates 18 having a gear 61 thereon which is driven by the drive mechanism 14 and having a front end on which the sprockets 25 are secured for rotation; a shaft 62 journalled for rotation between the plates 18 having a front end on which the sprockets 22 are mounted; a shaft 63 journalled for rotation on a bracket 64 pivotally mounted on the shaft 62 with the sprockets 23 mounted on the front end of the shaft 63 which extends through an arcuate guide slot 65 (FIGS. 1 and 2) in the front plate 18; a shaft 66 journalled for rotation on a bracket 67 pivotally mounted on the shaft 60 with the sprockets 24 mounted on the front end of the shaft 66 which extends through an arcuate guide slot 68 (FIGS. 1 and 2) in the front plate 18; a bar 69 pivotally connected to the brackets 64 and 67; and a reciprocating motor 70 comprising a solenoid 71 (FIG. 4) having its armature 72 linked to the bar 69, whereby upon movement of the bar 69 from left to right, as viewed, the upper strand 21 moves horizontally to the right and the slants of the side strands 28 and 29 are reversed.

Preferably, the stroke of the motor 70 is such that, when solenoid 71 is energized, as explained hereinafter, the armature 72 moves shafts 63 and 66 in guide slots 65 and 68, respectively, to the right ends of said slots, as viewed in FIG. 1, whereby the side strands 28 and 29 are slanted to the right, instead of to the left as shown in FIG. 1.

In the embodiment shown herein the slots 65 and 68 are of a length to enable the sprockets 23 and 24 to move through an arc of about ninety degrees. If such movement is fairly rapid, the side strand 29 tends to flip the cake therefrom and to overcome any tendency of the cake to stick to the web 20.

As shown in FIGS. 2 and 3, the bar 69 may comprise two sections 69L and 69R, a connecting rod 75 fixed on the section 69L and slidable with respect to the section 69R, a stop nut 76 on the rod 75 engageable by the section 69R, and a compressible spring 77 on the rod 75 and in engagement with adjacent ends of the bar sections. This arrangement normally tensions the web 20 and the sprockets 23 and 24 and allows the bracket 64 to be swung towards the right end of the conveyor 10 to relax the web 20 and enable the same to be removed and replaced like the web 40.

THE DRIVE MECHANISM

The drive mechanism 14, as shown in FIGS. 2 and 3, is a stepping motor 88 for effecting simultaneous stepwise movement of the conveyors 10 and 12. This motor comprises a drive gear 80 rotatably mounted on a shaft 81 supported between the plates 18 and in mesh with the upper conveyor drive gear 61 and in driving connection with the lower conveyor drive gear 48 through a gear 82; a ratchet 83 secured for rotating the gear 80; a pawl 84 pivotally mounted on the shaft 81 and supported by linkage 85 for driving the ratchet 83; and a solenoid 86 having an armature 87 connected to the pawl 84 for driving the same.

Preferably, the stroke of the solenoid 86 and the ratios of the gear 80 to the gear 61 and to the gears 82 and 48 are such that the upper strands of both the upper and lower conveyors move lengthwise an equal distance, slightly greater than the diameter of the cakes to be cooked.

THE TIMER

As shown in FIG. 4, the timer comprises a variable speed motor 90 controlled by a rheostat 89; a cam shaft 91 driven by the motor; normally open switches 92, 93 and 94 for energizing the solenoids 34, 71 and 86 of the hopper valve, the turn-over arrangement and the stepping motor, respectively; switch cams 95, 96 and 97 on the cam shaft having elements thereon for respectively closing the switches 92, 93 and 94 at timed intervals to complete one cycle of operation in which a serving of three cakes may be cooked upon one revolution of the motor.

The motor is connected to a source of electrical energy E by a switch 98 which when open renders the switches 92, 93 and 94 ineffective. The heating plates 26, 45 and 46 are connected to the source E through a manually operable switch 99, and are provided with rheostats 78 and 79 for controlling the temperature thereof. This enables the heating plates to heat the conveyor webs 20 and 40 before the cooking cycle is begun by first closing the switch 99.

In order to shut off the motor 90 when a cycle has been completed, a solenoid 100 is connected to the motor switch 98 to open the same. The solenoid 100 is energized by a normally open switch 101 which is closed by a cam 102 on the cam shaft 91 at the end of the cycle.

In FIG. 5, a chart is shown illustrating the switching operations which are performed at the angular disposition of the cam shaft during one revolution (360°) thereof. Preferably, one revolution requires between about 3 and about 4 minutes to cook three cakes. In this chart, V represents opening of the hopper valve 32 to feed batter for three cakes; I represents indexing or stepping to move the upper conveyor (1) after the first and second globs of batter have been deposited, and (2) after a pause for cooking of the cakes on one side, into position for flipping the three cakes, and to move the lower conveyor to discharge the cakes onto the plate PL after a pause for cooking of the cakes on their other sides; F represents shifting of the upper conveyor to flip the cakes; and M represents stopping of the motor through operation of the switch 101, the solenoid 100, and the switch 98.

The table about to follow illustrates the cycle in greater detail with the switching operations indicated in time and angular degrees of duration and in relation to the angle of rotation of the cam shaft, and P in this chart representing pause or non-motion of the conveyors while the stepping motor is inactive.

cam 102 could also be utilized to operate an alarm for indicating that the order of cakes is ready for serving.

From the foregoing description, it will be seen that the present invention provides automatic griddle cake cooking apparatus for preparing a serving of cakes which can be left unattended during the cooking cycle. The apparatus is constructed and arranged so that all of the mechanisms for driving the same are concealed and cannot be contaminated with batter or grease and that the elements contacted by batter or grease can be readily removed for thorough cleaning. The apparatus is rugged in construction and can withstand such usage to which it may be normally subjected without requiring repair or replacement of parts.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In apparatus for cooking griddle cakes, the combination of an endless conveyor serving as a griddle for cooking one side of the cakes thereon, means for supporting

*Camshaft controls*

| Operation | Time, sec. | Angular degrees | V | P | I | F | M |
|---|---|---|---|---|---|---|---|
| | | | [Angles counted counterclockwise] | | | | |
| V | 4 | 6¾ | 0°–6°51″ | | | | |
| P | 2 | 3¾ | | 6°51″–10°17″ | | | |
| I | 4 | 6¾ | | | 10°17″–17°9″ | | |
| V | 4 | 6¾ | 17°9″–24° | | | | |
| P | 2 | 3¾ | | 24°–27°26″ | | | |
| I | 4 | 6¾ | | | 27°26″–34°17″ | | |
| V | 4 | 6¾ | 34°17″–41°9″ | | | | |
| P | 66 | 113¼ | | 41°9″–154°17″ | | | |
| I | 4 | 6¾ | | | 154°17″–161°9″ | | |
| F | 4 | 6¾ | | | | 161°9″–168° | |
| I | 4 | 6¾ | | | 168°–174°51″ | | |
| F | 4 | 6¾ | | | | 174°51″–181°43″ | |
| I | 4 | 6¾ | | | 181°43″–188°34″ | | |
| F | 4 | 6¾ | | | | 188°34″–195°26″ | |
| P | 69 | 118¼ | | 195°26″–313°43″ | | | |
| I | 4 | 6¾ | | | 313°43″–320°34″ | | |
| P | 1 | 1¾ | | 320°34″–322°17″ | | | |
| I | 4 | 6¾ | | | 322°17″–329°9″ | | |
| P | 1 | 1¾ | | 329°9″–330°51″ | | | |
| I | 4 | 6¾ | | | 330°51″–337°43″ | | |
| P | 1 | 1¾ | | 337°43″–339°26″ | | | |
| I | 4 | 6¾ | | | 339°26″–346°17″ | | |
| P | 1 | 1¾ | | 346°17″–348° | | | |
| I | 4 | 6¾ | | | 348°–354°51″ | | |
| P | 1 | 1¾ | | 354°51″–356°34″ | | | |
| M | 2 | 3¾ | | | | | 356°34″–360° |
| | 210 | 360 | | | | | |

Explanation of symbols: V=Valve opens and closes; P=Pause; I=Index; F=Flip; M=Motor stops.

OPERATION

In operation of the apparatus the heating plate rheostats and the motor rheostat (FIG. 4) are adjusted so that the plates provides sufficient heat to cook the cakes within the duration of time it requires the motor to make one revolution, and the switch 99 is closed to preheat the web of the conveyors. After this has been accomplished, the motor switch 98 is closed manually and the motor 90 drives the apparatus through one cycle of operation, as already described, to fill an order for one serving of three cakes. When the motor 90 is stopped at the end of the cycle, heating of the plates 26, 45 and 46 may be continued to have the apparatus ready for the next order during busy periods or the plates may be de-energized by opening the switch 99 when only occasional orders are expected.

While the apparatus has been illustrated and described in connection with cooking a serving of three cakes, it will be understood that the apparatus could be modified to cook any desired number of cakes per serving by providing the switch cams with the appropriate number and arrangement of switch operating elements.

Also, it will be apparent that the motor shut-off switch said conveyor to provide a horizontal strand and a side strand at one end of said horizontal strand having an inclined upwardly facing surface, and means for normally retracting said supporting means to maintain said surface of said side strand facing upwardly and for selectively shifting said upwardly facing surface into an inclined downwardly facing position to turn over and deliver cakes having one side cooked.

2. In apparatus according to claim 1, including heating means beneath said horizontal strand for transferring heat thereto.

3. In apparatus according to claim 1, including a second endless conveyor serving as a griddle for cooking the other side of the cakes thereon and having a strand positioned beneath said side strand for receiving turned-over cakes from said first mentioned conveyor.

4. In apparatus according to claim 3, including heating means beneath said strand of said second conveyor and in contact therewith for transferring heat thereto.

5. In apparatus according to claim 4, including heating means beneath said horizontal strand of said first mentioned conveyor and in contact therewith for transferring heat thereto.

6. In apparatus according to claim 5, including means for moving said conveyors stepwise in synchronism, means for depositing batter on said horizontal strand of said first mentioned conveyor while at rest, and means for actuating said shifting means of said first mentioned conveyor.

7. In apparatus according to claim 6, including means for synchronizing said batter deposition means, said conveyor moving means, and said shifting means of said first mentioned conveyor.

8. In apparatus for cooking and turning over griddle cakes, the combination of an endless conveyor serving as a griddle for cooking one side of the cakes thereon, means for supporting said conveyor to arrange the same as a parallelogram including two upper and two lower elements at each end to provide upper and lower horizontal strands and inclined side strands with the side strand at a delivery end of said upper strand having an upwardly facing surface, and means for shifting said upper elements horizontally to move said upwardly facing side strand surface into a downwardly facing position.

9. In apparatus according to claim 8, including linkage for said upper and lower elements at the respective ends of said conveyor, means for supporting each of said upper elements including a shaft and structure formed with arcuate guide surfaces for said shafts, a bar pivotally connected to said linkage, and a motor means in said shifting means for reciprocating said bar.

10. In apparatus according to claim 8, including means for depositing batter on said upper strand, means for moving said conveyor stepwise, and means for rendering said batter depositing means effective.

11. In apparatus for cooking and turning over griddle cakes, the combination of an upper endless conveyor serving as a griddle for cooking one side of the cakes thereon, means for supporting said upper conveyor to provide a horizontal strand and a side strand at a delivery end of said horizontal strand having an inclined upwardly facing surface, valve controlled batter depositing means above said upper conveyor, a lower endless conveyor serving as a griddle for cooking the other side of the cakes thereon, means for supporting said lower conveyor to provide a horizontal strand adjacently beneath said side strand, means for simultaneously driving both of said conveyors stepwise, mechanism for shifting said upper conveyor supporting means to maintain said horizontal strand in its horizontal position and to move said side strand to place its upwardly facing surface in an inclined downwardly facing position to cause a cake thereon to be turned over and deposited on said lower conveyor, and synchronized control means for said driving means, the valve of said batter depositing means and said shifting mechanism including timing elements for alternately opening said valve and moving said conveyors stepwise and for alternately operating said shifting mechanism and moving said conveyors stepwise.

12. In apparatus according to claim 11, wherein heaters are positioned beneath said horizontal strands, and said timing elements are arranged to pause said conveyors between the valve opening and shifting operations for a sufficient duration of time to cook the cakes.

13. In apparatus according to claim 12, wherein said control means include a timing element for de-energizing said conveyor driving means.

References Cited by the Examiner
UNITED STATES PATENTS

| | | | |
|---|---|---|---|
| 1,263,929 | 4/1918 | Rios | 100—57 X |
| 1,679,717 | 8/1928 | Greer | 107—57 |
| 2,391,691 | 12/1945 | Engels | 198—33.4 |
| 2,709,412 | 5/1955 | Eagerman | 107—57 |
| 2,786,430 | 3/1957 | Robbins et al. | 107—27 |
| 2,899,914 | 8/1959 | Van Arsdell | 107—57.1 |
| 3,093,062 | 6/1963 | Forrester | 107—57 X |

WALTER A. SCHEEL, *Primary Examiner.*
ROBERT E. PULFREY, *Examiner.*